June 2, 1925. 1,540,144
A. G. REDMOND
CHARGE HEATING CONTROL FOR INTERNAL COMBUSTION ENGINES
Filed April 22, 1920 2 Sheets-Sheet 2
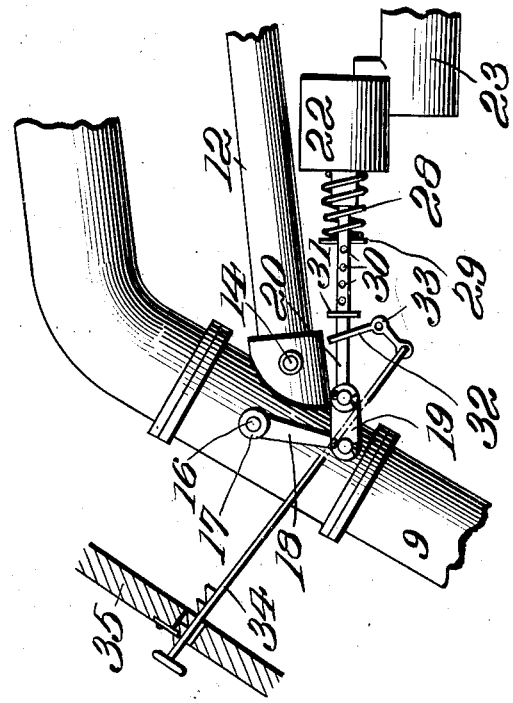
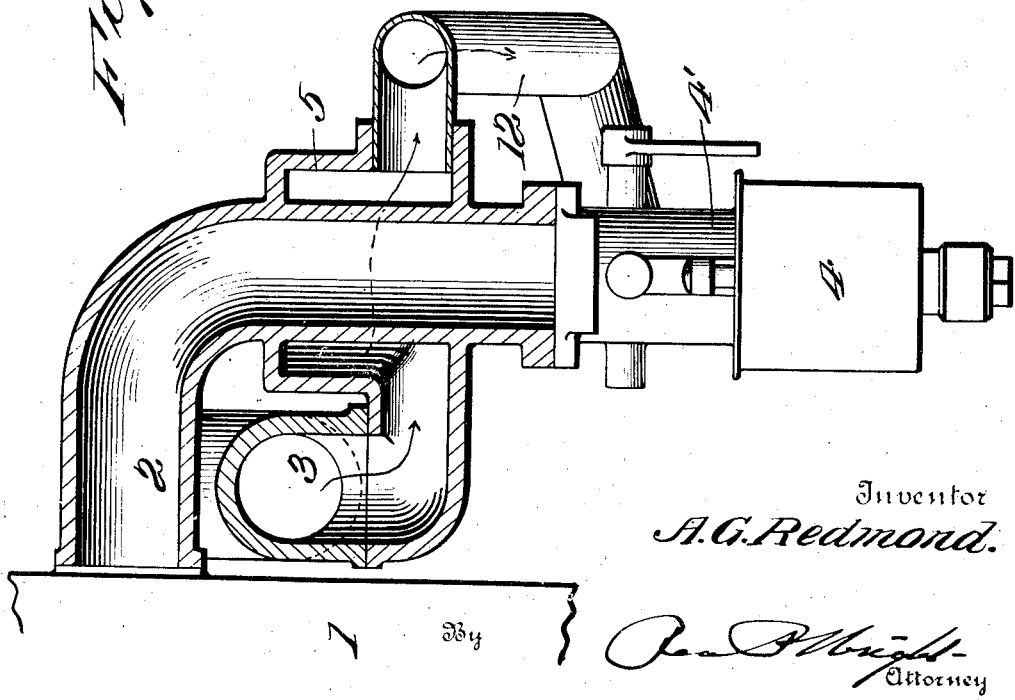
Inventor
A. G. Redmond.

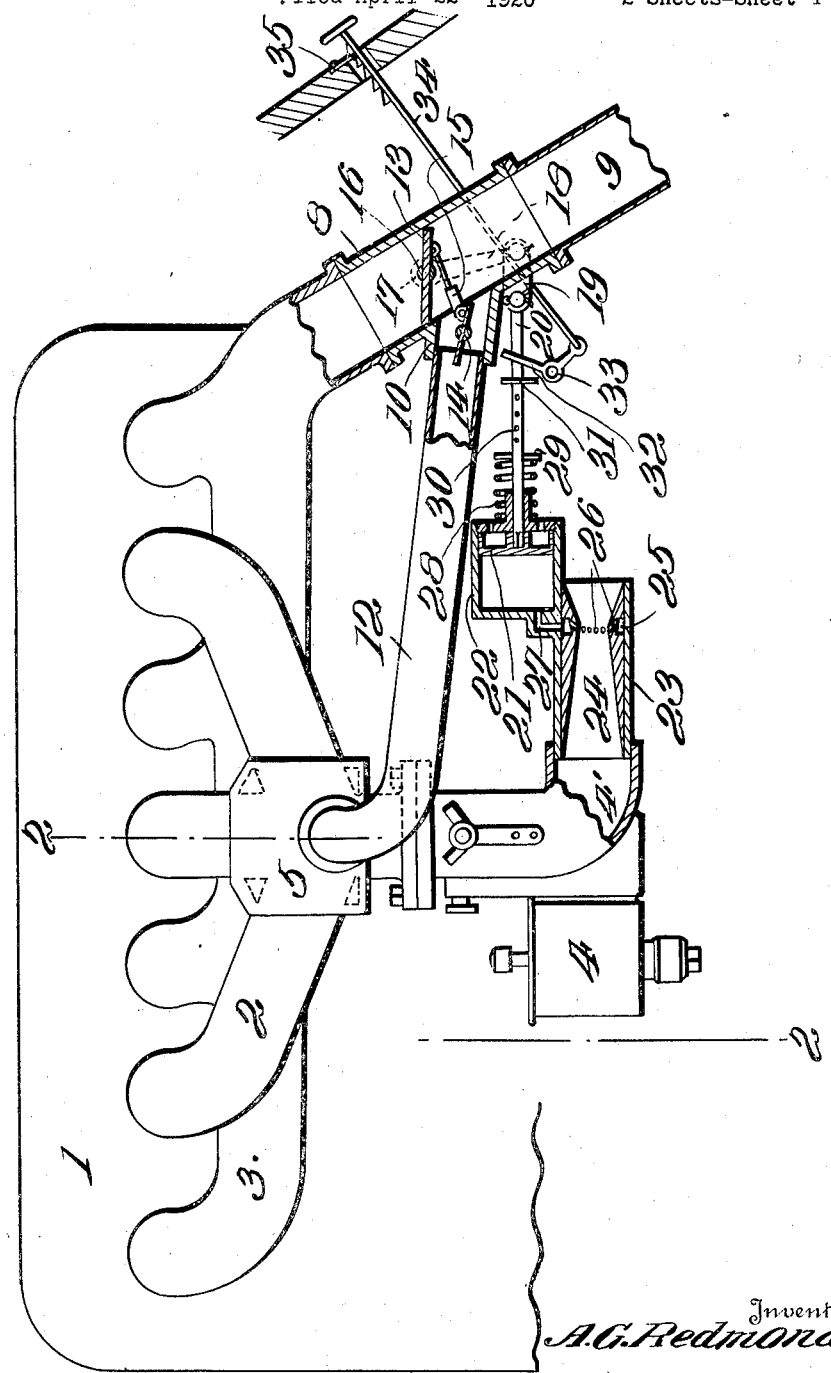

Patented June 2, 1925.

1,540,144

UNITED STATES PATENT OFFICE.

ALBERT G. REDMOND, OF INDIANAPOLIS, INDIANA, ASSIGNOR TO MARVEL CARBURETER COMPANY, OF FLINT, MICHIGAN, A CORPORATION OF INDIANA.

CHARGE-HEATING CONTROL FOR INTERNAL-COMBUSTION ENGINES.

Application filed April 22, 1920. Serial No. 375,772.

*To all whom it may concern:*

Be it known that I, ALBERT G. REDMOND, a citizen of the United States, residing at Indianapolis, in the county of Marion and State of Indiana, have invented certain new and useful Improvements in Charge-Heating Controls for Internal-Combustion Engines, of which the following is a specification, reference being had therein to the accompanying drawing.

This invention relates to certain new and useful improvements in charge heating control for internal combustion engines, the object being to provide means whereby the maximum heat is applied to the intake manifold at low speed and the minimum heat at high speed.

A still further object of the invention is to provide a construction of charge heating control which is capable of being readily applied to any of the well known types of internal combustion engines now in use, the induction or intake pipe of the engine being surrounded by a heating jacket through which is adapted to circulate the exhaust gases from the internal combustion engine which is automatically controlled by the vacuum produced by the suction of the engine in the passage of the air into the charge forming device.

A still further object of the invention is to provide novel means whereby the valves controlling the passage of gas to the heating jacket can be manually operated for warming up the engine.

A still further object of the invention is to provide the exhaust pipe of the internal combustion engine with a valve in connection with the valve for the outlet of the heat jacket, said valves being connected together so that when one is opened the other is closed, whereby the entire exhaust can be diverted from its natural path of travel through the heating jacket.

A still further object of the invention is to provide a construction which is exceedingly simple and cheap to manufacture, the parts being so arranged and connected together that all danger of the same getting out of order in use is prevented.

Other and further objects and advantages of the invention will be hereinafter set forth and the novel features thereof defined by the appended claims.

In the drawings,

Figure 1 is a side elevation of a portion of an internal combustion engine showing the application of my improved construction of charge heating control applied thereto, the same being partly shown in section.

Figure 2 is a section taken on line 2—2 of Figure 1; and

Figure 3 is a detailed side view showing the arm and link connection of the valve.

In the drawing 1 indicates an internal combustion engine, 2 the intake manifold, 3 the exhaust manifold and 4 the charge forming device of any of the well known types now in use having its upper end connected to the induction or intake manifold in the usual manner. Surrounding the intake manifold 2 is a jacket 5 provided with a heat chamber 6 in communication with the exhaust manifold 3 through a passage 7 and while I have shown the exhaust manifold and intake manifold constructed in a particular manner, I do not wish to limit myself to the construction shown, as of course the ordinary construction of manifolds now in use can be employed and a separate heat jacket can be placed around the intake manifold and connected to the exhaust manifold by a pipe or pipes to accomplish the same result without departing from the spirit of my invention.

Connected to the outlet end of the exhaust 3 is a pipe section 8 to which is connected the exhaust pipe 9 extending to the muffler in the usual way. The exhaust pipe section 8 is provided with a branch inlet 10 which is connected to the outlet 11 of the heating chamber 6 by pipe 12 whereby the exhaust gases from the exhaust manifold 3 can circulate through the heating chamber and be conveyed through the pipe 12 back into the exhaust pipe section 8.

Pipe section 8 is provided with butterfly valve 13 connected to a valve 14 mounted in the branch 10 by link 15 so that when the valve 13 is closed the valve 14 will be opened and when the valves are in this position the entire exhaust from the internal combustion engine is caused to pass through the heating jacket. These valves can be adjusted in respect to each other so that the valve 13 will remain partly open at all times, the link 15 being in the form of an adjustable link or the valves can be set to accomplish this purpose.

The valve 13 is mounted on a valve stem 16 extending transversely through the pipe section 8 and carries a collar 17 provided with an arm 18 having its free end connected to a link 19 which is connected to piston rod 20 provided with a piston 21 mounted within a vacuum cylinder 22. The vacuum cylinder 22 is herein shown formed integral with an air pipe 23 which extends into the air inlet 4' of the charge forming device 4 but it is of course understood that these parts can be made separate and connected together in any suitable way.

Arranged within the air inlet pipe 23 is a Venturi tube 24 provided with an annular groove 25 forming an annular chamber having ducts 26 extending obliquely through the wall thereof in communication with the restricted portion of the venturi. The annular chamber 25 is in communication with the vacuum chamber 22 through a passage 27 and by this construction the vacuum produced within the venturi 24 by the suction of the engine creates a vacuum in the vacuum chamber 22 so as to cause the piston 21 to be drawn forward in the vacuum cylinder and through its connection with the valve 13 the valve is opened as the vacuum increases therein which is caused by the increased speed of the motor which allows the exhaust gases to pass from the exhaust manifold directly through the pipe section 8 to the muffler in the ordinary manner. When the engine is running at low speed or idling the vacuum is insufficient to operate the piston and the valve 13 remaining closed as the speed of the engine is increased, the suction increases which increases the vacuum and the piston is moved so that the valve 13 is gradually opened whereby only a portion of the exhaust gases are passed through the heating chamber.

The piston rod 20 is surrounded by coil spring 28, the tension of which is adjusted by pin 29 extending through one of the series of openings 30 formed in the piston rod so that by shifting the pin from one opening to another the amount of vacuum required to move the piston can be regulated as by weakening the spring the butterfly valve 13 opens at lower engine speed as it requires less vacuum in the vacuum cylinder to move the piston. This spring is adjusted for different temperatures, as for instance in winter the tension of the spring is increased and in summer the tension of the spring is reduced.

In order to provide means for manually operating the valves the piston rod is provided with a collar 31 which is adapted to be engaged by the bifurcated arm 32 of a crank 33 which is connected to an operating rod 34 extending through the dash 35 provided with a knob whereby the same can be grasped by the operator and pulled and it will be seen that when the crank is rocked on its pivot, the piston rod will be moved forward within the vacuum cylinder and through the link connection with the valve 13, the valve will be opened.

From the foregoing description it will be seen that I have provided an automatic charge heating control for internal combustion engines having a vacuum chamber in communication with the air inlet of the charge forming device by means of which through the medium of links and levers the valves disposed in the exhaust pipe are automatically controlled whereby the proper amount of heat will be applied to the charge delivered to the internal combustion engine to prevent overheating the charge.

What I claim is:—

1. An internal combustion engine having an exhaust pipe, intake manifold and charge forming device connected thereto, a heating chamber arranged to heat the charge in its passage to the engine having an inlet and outlet pipe connected to the exhaust pipe, a valve disposed in the exhaust pipe between the inlet and outlet of the connection with said heater, a valve in the outlet pipe of said heater having a connection with said valve and means for actuating the first mentioned valve controlled by the changing vacuum existing in the air inlet of said charge forming device.

2. An internal combustion engine having an exhaust pipe, intake manifold and charge forming device having a carbureting passage connected thereto, a heating chamber surrounding said carbureting passage having an inlet and outlet connected to the exhaust pipe, a valve arranged in the exhaust pipe, a valve arranged within the outlet of said heater, an adjustable connection between said valves and means for actuating the first mentioned valve controlled by the changing vacuum existing in the air inlet of said charge forming device.

3. An internal combustion engine having an exhaust pipe, intake manifold and charge forming device connected thereto, said charge forming device having an air inlet provided with a venturi, a heater for heating the charge in its passage from said charge forming device to said engine, said heater having inlet and outlet pipes connected to the exhaust pipe, a vacuum chamber in communication with the restricted portion of said venturi, a plunger working in said chamber, a valve mounted in said exhaust pipe and a connection between said valve and said plunger for controlling the admission of exhaust gases to said heater by the changing vacuum existing in said Venturi tube.

4. An internal combustion engine having an exhaust pipe, intake manifold and charge forming device connected thereto, a heater arranged to heat the charge delivered to the engine, said heater having an inlet and an outlet connected to the exhaust pipe, a valve mounted in the exhaust pipe intermediate its connection with said heater, a Venturi tube disposed in the air inlet of said charge forming device, a vacuum chamber in communication with said Venturi tube, a plunger working in said vacuum chamber, adjustable means for exerting resistance to the movement of said plunger and a connection between said valve and said plunger for controlling the passage of heating fluid through said heater by the changing vacuum existing in the venturi of the air inlet of said charge forming device.

5. An internal combustion engine having an exhaust pipe, intake manifold and carbureter connected thereto, a heater arranged to heat the charge delivered to the engine, said heater having an inlet and outlet, the inlet being connected to the exhaust at a point adjacent the engine and the outlet to the exhaust at a point remote from the engine, a valve arranged within the exhaust, a second valve arranged to control the passage of the exhaust gases through said heater, a connection between said valves, an air pipe arranged within the air inlet of said carbureter, a vacuum chamber in communication with said air pipe, a piston in said vacuum chamber and a connection between said piston and the first mentioned valve for actuating said valve by the changing vacuum existing in the air inlet pipe.

6. An internal combustion engine having an exhaust manifold, intake manifold and charge forming device therefor, a heating chamber surrounding said intake manifold having an inlet in communication with the exhaust pipe, an exhaust pipe section connected to said exhaust manifold, said pipe having a branch, a pipe section connecting said branch to the outlet of said heater, a valve arranged within said branch, a valve arranged within said exhaust pipe section, a connection between said valves and means actuated by the changing vacuum existing in the air inlet of said charge forming device for actuating said valves for controlling the passage of exhaust gases through said heater.

7. An internal combustion engine having an exhaust manifold, intake manifold and charge forming device therefor, a heater arranged to heat the charge in its passage from the charge forming device to the engine, said heater being in communication at two points with said exhaust manifold, a valve arranged within said exhaust, means for actuating said valve by the changing vacuum existing in the air inlet of the charge forming device and manually operated means for actuating said valve.

8. A charge heating device for internal combustion engines comprising a heater adapted to be arranged around the induction pipe of the internal combustion engine, a pair of valves for controlling the passage of exhaust gases to said heater, means for actuating said valve by the changing vacuum existing in the air inlet of the charge forming device and means for manually operating said valves.

9. An internal combustion engine having an exhaust pipe, intake manifold and carbureter connected thereto, a heating chamber surrounding said intake manifold having an inlet and outlet, the inlet being in communication with said exhaust manifold, a valve mounted in said exhaust pipe, a pipe extending from the outlet to said heater to said exhaust pipe on the outlet side of said valve, a second valve arranged in said exhaust pipe, an adjustable connection between said valves, a vacuum chamber, an air inlet pipe for said carbureter having a venturi in communication with said vacuum chamber, a spring resisted piston mounted in said chamber, means for adjusting the tension of said spring, a connection between said piston and the first mentioned valve and manually operated means for actuating said piston for operating said valves for controlling the passage of exhaust gases through said heater.

In testimony whereof I have hereunto affixed my signature in the presence of two witnesses.

ALBERT G. REDMOND.

Witnesses:
Mrs. R. H. Gilmore,
S. R. Butler.